Aug. 5, 1958     E. GABBRIELLI     2,845,656
MACHINE FOR MIXING AND EXTRUDING PLASTICS AND THE LIKE
Filed Dec. 24, 1952     2 Sheets-Sheet 1
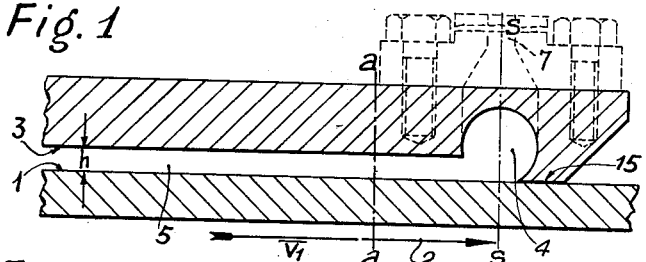
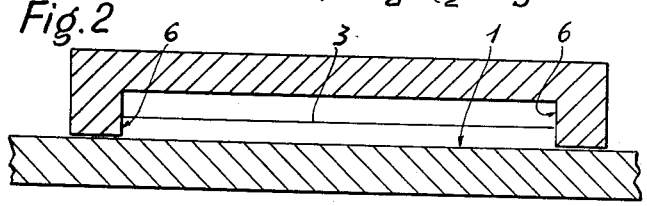
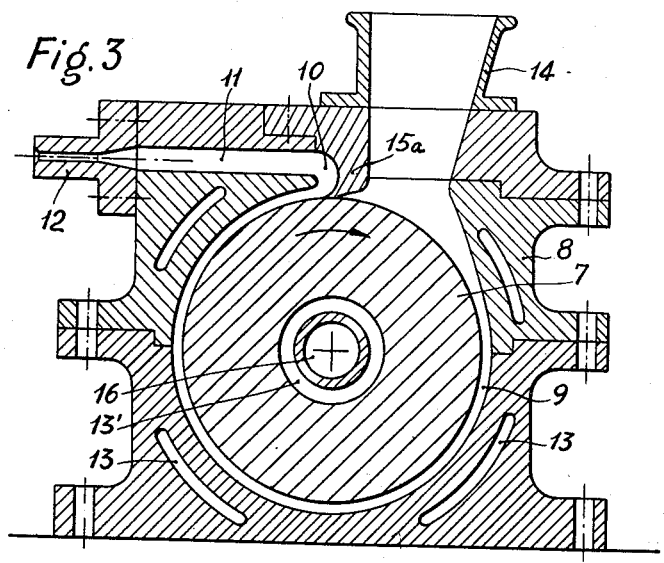
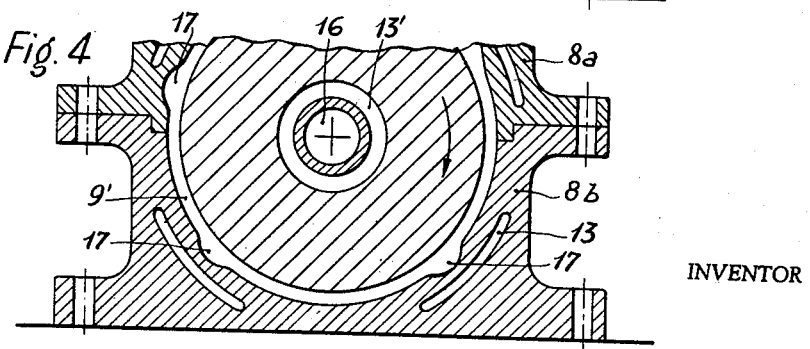
INVENTOR
ERNESTO GABBRIELLI
BY
ATTORNEY Aug. 5, 1958  E. GABBRIELLI  2,845,656
MACHINE FOR MIXING AND EXTRUDING PLASTICS AND THE LIKE
Filed Dec. 24, 1952  2 Sheets-Sheet 2
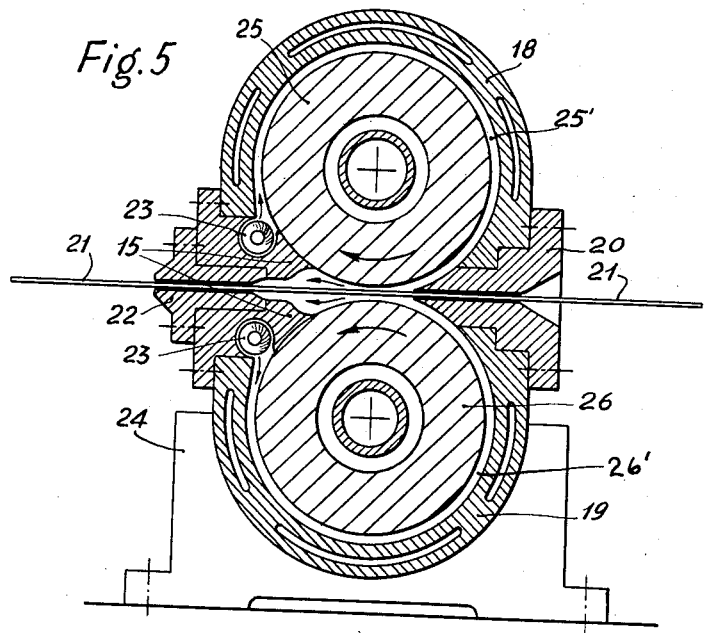
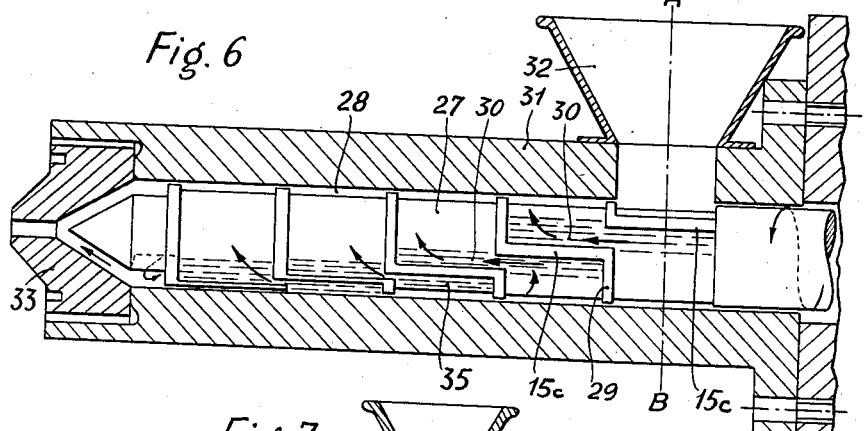
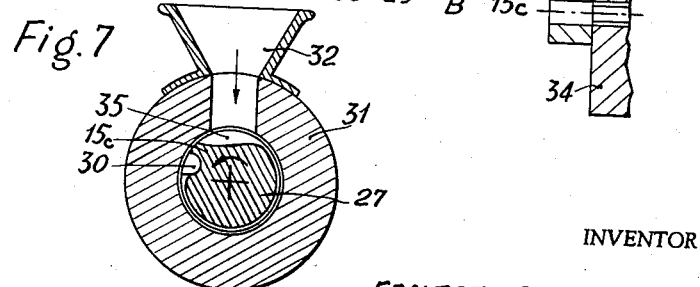
INVENTOR
ERNESTO GABBRIELLI
BY
ATTORNEY United States Patent Office 2,845,656
Patented Aug. 5, 1958

2,845,656

MACHINE FOR MIXING AND EXTRUDING PLASTICS AND THE LIKE

Ernesto Gabbrielli, Milan, Italy

Application December 24, 1952, Serial No. 327,731

Claims priority, application Italy December 28, 1951

5 Claims. (Cl. 18—12)

The present invention relates to machines for mixing and extruding pasty and plastic substances, such as thermoplastic materials and synthetic resins in general.

The machine constituting an object of the present invention realises a progress over those now in use, for it assures a more uniform working of the entire plastic mass and an easier elimination of the stagnations of the substances within the machine, which stagnations are very detrimental to some materials.

Said machine, besides, affords the possibility of effecting extrusions even over wide fronts, thus providing an easy solution to the problem of a direct extrusion of wide plastic substance sheets, as well as to the problem of covering with coatings of thermo-plastic substances, or the like, the surfaces of rigid or flexible material sheets, such as metal plates, plywood, paper or cardboard sheets, fabrics, nets or the like. Besides, it is possible to realize and commercialize by the present invention new industrial products for various applications.

More particularly, according to the present invention, the pasty substance is obliged to travel through channels of which at least one wall is caused to move relative to the others, so that on account of the drag exerted by this movable wall over the mass of material being worked, combined with the scraping action of organs provided within said channels of the machine, the material being worked is subjected simultaneously to a forcible and repeated mixing and to the necessary thrust for its extrusion from a suitable die.

The annexed drawings schematically and by way of an example illustrate some practical embodiments of the invention, and precisely:

Figs. 1 and 2 are diagrammatic longitudinal and transverse sections, respectively, of a device embodying the principle upon which the invention is based, the section of Fig. 2 being taken along line a—a of Fig. 1.

Fig. 3 shows diagrammatically a section of a machine constructed according to the invention.

Fig. 4 illustrates in an analogous section a variant to the machine of Fig. 3.

Fig. 5 is a section corresponding to the preceding ones, of a machine suitable for coating the two faces of a sheet material, a metal plate, for instance.

Fig. 6 is a longitudinal section of an embodiment, differing from the preceding ones, of a machine according to the invention.

Fig. 7 is a section taken at line A—B of Fig. 6.

As shown by Figs. 1 and 2, the machine according to the present invention comprises at least one wall 1 which is supposed to be with movement in respect to wall 3, the two walls together defining a channel 5. Wall 3 is supposed to be stationary, whereas wall 1 is supposed to be movable in the direction of arrow 2 with a speed V1.

With the above cited walls is combined an organ or wall 15, which in the case illustrated is connected with the element forming the wall 3 of channel 5, said wall 15 being such as to preferably present a sharp edge by which it exerts a scraping action over movable wall 1, so as to practically completely separate or scrape off the layer of pasty material being dragged along to adherence by wall 1. Thus said material is constrained to collect under a substantial pressure within chamber 4 of Fig. 1 and, in case the latter is closed as indicated in said figure, said material is compelled by the pressure itself to travel in a direction opposite to the preceding one, that is, opposite to the direction of arrow 2, while the upper part of channel 5 brings about a very intimate and complete mixing up action upon the material. In case chamber 4 is not closed but extends to a conduit 7 leading to a die, as indicated by the dotted lines, the material passing in channel 5 and dragged along and mixed up by the effect of the movement of wall 1, will be extruded under a pressure that can be regulated by regulating the speed of said wall 1, and the desired results will be attained.

In conclusion, with the above disclosed principle illustrated in Figs. 1 and 2, in the latter of which are visible the side walls 6 that are in this case fixed, it will be possible to obtain an intense mixing of the material introduced into the machine, if chamber 4 in which the material detached by scraper 15 from movable surface 1 is closed, whereas, if from said chamber departs a conduit leading to a die, the material fed to conduit 5 will be subjected to a less intense mixing than the preceding one and also to an extrusion through the aforesaid die.

Of course, the intensity of the mixing will depend, not only upon the height of the channel and the viscosity of the material, but also upon the value of the speed V1 of wall 1, which is to be such as to generate a capacity or rate of movement of dragged material greater than that of the material going out by extrusion from the die.

The physical laws ruling the distribution of static pressures within viscous fluid materials are such as to produce, in the case under examination, a progressive increase in the static pressure in the direction of arrow 2, up to the maximum final pressure P corresponding to the one that is generated in chamber 4. This pressure will be a function of the physical and dynamical coefficient of the material, as well as of the distance $h$ between walls 1 and 2, of the development of said walls in the direction of the movement of wall 1, of the speed of said wall 1 in respect to wall 3, and of the relative speeds of the material between the aforesaid walls.

It follows from this that the schematic apparatus of Figs. 1 and 2 becomes capable of creating a pressure P of the material within chamber 4, a corresponding extrusion capacity and a continuous mixing of the material to be extruded; it realizes, in fact, all the conditions for the good working of an extruding-mixing apparatus.

Fig. 3 illustrates very schematically an embodiment of a machine working according to the above disclosed principle, upon which the present invention is based. The movable wall is realised in this case by the outer surface of a drum 7 rotatably mounted on end supports 16 and around which is co-axially disposed a cylindrical chamber disposed in an external body 8 forming also the frame and base of the machine. Between the two walls of elements 7 and 8 is left an interspace 9 constituting the channel that is to be travelled by the material being worked upon. The hollow cylindrical wall of body 8 is interrupted transversely to its generating line so as to form one entrance wall of a chamber 10 joining with a conduit 11 leading to an extrusion die 12. The other wall of conduit 11 extends toward the outside surface of drum 7 into an organ fitted to it and ending as a knife blade 15a that is in contact with, or more or less near, said surface of drum 7 and constitutes the scraping organ, which is similar to that indicated by reference number 15 in Fig. 1. Downstream from said organ 15a following the sense of rotation of drum 7 the phase of feeding the material to the machine is effected, said feeding being done through hopper 14 that is suitably connected with channel 9, as is clearly seen in Fig. 2. In the interior of body 8 are provided chambers or conduits 13 adapted to being travelled by heating and cooling fluids, to the end of being able to thermically operate upon the material being worked in the machine. Drum 7 also may have one or more chambers such as 13' intended to be travelled by a cooling and heating fluid in order to cool or heat up the movable surface of channel 9 in contact with the material being worked.

The working of the above described machine is as follows: the material in the form of a paste, of thermoplastic powders or the like, is introduced via hopper 14 into channel 9 of the machine and is caught between the rotating surface of drum 7 and the internal cylindrical stationary surface of body 8. As soon as the whole volume of channel 9 has been entirely filled up, the limiting layer toward the axis of rotation of the drum adheres strongly to the surface of drum 7 and is dragged along by the latter thanks to a phenomenon similar to the priming of a pump for viscous liquids. From this instant on, the working illustrated by Fig. 1 is regularly carried on. In other words, the material continuously fed to hopper 14 arrives under pressure into extrusion channel 11 and comes out from it through die 12 assuming the desired shape. Both the extrusion pressure and the mixture coefficient will depend above all upon the speed of rotation of drum 7, for each type and size of the die employed.

The above described machine lends itself most advantageously to the continuous extrusion of structural shapes having a considerable width, as for instance, thin thermoplastic material sheets, such as vinyl chloride sheets, intended for tapestries or carpets, and sheets of transparent or colored cellulose acetate, polystyrol and the like. It is also possible to advantageously and continuously obtain plain and corrugated shapes having any desired form.

As already said, the machine provided by the invention lends itself with great advantage to the fabrication of all kinds of materials coated with layers of thermo-plastic materials over one or both faces. The machine illustrated in Fig. 5 is particularly suitable for this end. It comprises two drums or rotating bodies 25 and 26, symmetrically disposed in respect to the axial plane of the strip 21 of the material to be coated. The two drums 25 and 26 are respectively encircled by stationary bodies 18 and 19, such as to leave between themselves and the rotating drums the interspace that is to be traversed by the material under work. As in the case of Fig. 3, each of the interspaces or channels 25' or 26' is limited at a certain point by a scraping organ 15b that is in contact or not with the rotating drum and that forces the pasty material dragged along by, and adhering to, the latter, to at least partly detach itself to introduce itself into the channel leading to die 22. In this specific case, the two channels 25' and 26' open into zones adjacent to the two opposed faces of the rolled material 21 that, as has been said, can be a metal sheet, a paper sheet or a pasteboard, a fabric or similar sheet material. Said rolled material is supported and guided by an expressly adapted organ 20, while, as has been said, at the other side of the machine, that is at the side from which said rolled material comes out, die 22 is provided, going through which the rolled material 21 gets coated with a thin layer of the material fed into conduits 25' and 26' of the machine.

The feeding of the coating material into channels 25' and 26' is effected for instance by feed screws 23. In the case illustrated these are two in number, but for machines of considerable length, there might be four or more.

The working of each extension unit of the now described machine is wholly similar to that of previously described Fig. 3.

The variant of Fig. 4 shows some enlargements or widenings 17 provided in the stationary wall of conduit 9', that is, made in stationary body sections 8a and 8b of the machine. Said widenings 17 are disposed perpendicularly to the direction of the relative speed of the surfaces delimitating channel 9' and constitute slowing down zones for the material introduced into the machine, which in a great many cases may be advantageous either in order to cross different layers of materials to gain a better transverse mixing of the same, or to collect the material for the distribution and equalizing of the pressures and capacities of the machines.

The rotating parts of the above described machine can be driven by any suitable means, such as speed reducers or continuous speed regulators, and the constructional shape of the several above described organs, and particularly of the scraping organs, may vary according to necessity without departing from the principles of the present invention. For example, the scraping organs may act resiliently upon the rotating organs by being urged against them by means of springs or the like.

Fig. 6 illustrates a type of machine slightly different from the preceding ones. It comprises, in fact, a stationary part 31 traversed by a cylindrical cavity in which is rotatably mounted a cylindrical body 27 such as to leave a cylindrical interspace between it and the cavity of body 31. Rotating body 27 possesses a plurality of projections 29 combined with recesses like those marked by 30 and 35. In the case illustrated, projections 29 have the form of an open ring and are connected to one another by projections parallel to the axis of cylinder 27 and constituting the scraping organs 15c. The machine is completed by a feed hopper 32, disposed in communication with one of the ends of rotating cylindrical body 27, and by a die 33 mounted on stationary part 31 in communication with the terminal portion of said rotating cylinder 27.

The working of this machine is entirely similar in principle to that of the precedingly described embodiments. And, in particular, the material introduced through hopper 32 fills the first zone of the annular interspace 28 existing between rotating cylinder 27 and the cylindrical cavity of body 31 and is mixed and partially carried into movement by the rotation of said cylinder 27. Transverse projection 15c, or scraping blade, rotates in this case with rotatable body 27, and will exert its scraping action over the stationary surface of interspace 28 so as to detach from the latter the material that would otherwise remain stationary and adhering to it. Said material is thus pushed, in the direction of the arrows, into the second zone of interspace 28 where the material is subjected to a treatment perfectly analogous to the one to which it was subjected in the preceding zone, only its pressure may be increased thanks to the scraping action of the second transverse projection 15c, and the material will thus be forced to pass into the third zone and so on, following the travel indicated by the arrows, until it will arrive at the die 33 through which it will be extruded under a perfectly controlled pressure by regulating the speed of rotation of drum 27.

Feeding of the machine of Fig. 6 could also be effected by means of a cochlea incorporated in the same rotating body 27, in the zone below feeding hopper 32.

In the embodiment of the above described machine one obtains the multiplication of the pressures in the succeeding zones into which the machine is subdivided, which may for certain work be very advantageous. A machine according to the invention may also be realised in a manner analogous to those illustrated in Figs. 6 and 7, but in it the successive work zones can be incorporated in the internal part of the stationary body.

Of course, many changes and modifications may readily be made in carrying out the invention. In particular, movable surface 1 of Fig. 1 may be provided by an endless flexible belt mounted upon suitable pulleys. Besides, in all of the above described embodiments the hollow cylindrical surface may constitute a support for the rotating one, and in particular the latter may be supported at its outer ends, in a perfectly centered manner in respect to the former. In this way rolling friction between the working parts will be avoided, which may be very advantageous for preventing that the wear by friction of the working walls may alter the very delicate appearance of the plastic materials or contaminate the alimentary or chemical products that would be treated in machines of this kind.

The variety of the ways of combination of the movable and stationary surfaces, as well as of combination with the scraping element, renders very easy the solution of the most varied extrusion fabricating problems of profiled shapes, which is something that was not easily obtainable with the extrusion machines up to now in use.

Particularly, the known machines featuring a cochlea do not allow a large front extrusion, and the gear machines also, in order to solve such a problem, would require mechanical realisations to be attained only with difficulty and extra cost.

With the machine according to the invention, it is possible, by using rotors having a considerable diameter, to effect several stages of work on angular sectors of the circumference symmetrically distributed, to the end of obtaining a balance of the strains on the rotor, and consequently a neutralisation of the thrusts upon the end supports of the rotating parts.

The interspaces forming the channels to be travelled by the material under treatment may have a very small height or thickness, so as to render the heating and cooling of the mass a very easy matter, which was not possible with the types of machines of the known varieties.

The depth of the above said channels may also be variable, should that be thought convenient, and the body itself of the machine should preferably be composed of separable parts both for simplifying machining operations, assembling and disassembling, and to provide for an easier and quicker maintenance of the machine.

What I claim is:

1. A machine for mixing and extruding a viscous plastic material that adheres to surfaces of the machine, comprising at least two wall-forming members defining an elongated channel adapted to be traversed by said material, one of said members being movable relative to another in the direction of the length of said channel, said relatively movable members respectively forming oppositely facing bounding walls of said channel spaced apart therealong at a distance so limited that said material is dragged in said direction and mixed in said channel by the relative movement of said walls, a compression chamber fixed relative to one of said walls, scraper means forming an entrance wall of said chamber arranged to engage material on the other of said walls for scraping such material from the latter and leading it into said chamber, said material being conveyed over said scraper means and into said chamber under pressure generated by said relative movement, and a restricted extrusion passageway extending away from said chamber for conducting such material therefrom under said pressure.

2. A machine for mixing and extruding a viscous plastic material that adheres to surfaces of the machine, comprising at least two wall-forming members defining an elongated channel adapted to be traversed by said material, one of said members being stationary and another being movable in the direction of the length of said channel, said stationary and movable members respectively forming oppositely facing stationary and moving bounding walls of said channel spaced apart therealong at a distance so limited that said material is dragged in said direction and mixed in said channel by the relative movement of said walls, a compression chamber in said stationary member at an end of said channel to which said material is conveyed by said movement, a transverse extension of said stationary wall forming one entrance wall of said chamber, stationary scraper means forming another entrance wall of said chamber arranged to engage material on said moving wall for scraping such material from the latter and leading it into said chamber, said material being conveyed over said scraper means and into said chamber under pressure generated by said relative movement, and a restricted extrusion passageway extending away from a part of said chamber opposite its entrance for conducting such material therefrom under said pressure.

3. A machine for mixing and extruding a viscous plastic material that adheres to surfaces of the machine, comprising at least two wall-forming members defining an elongated channel adapted to be traversed by said material, said channel being substantially rectangular in cross section and internally unobstructed from end to end thereof so as to hold a continuous sheet-like mass of said material, one of said members being movable relative to another in the direction of the length of said channel, said relatively movable members respectively forming substantially parallel bounding walls of said channel spaced apart therealong by a distance so limited that said material is dragged in said direction and mixed in said channel by the relative movement of said walls, a compression chamber fixed relative to one of said walls and extending transversely from it over the width of said channel at an end of the channel to which said material is conveyed by said movement, scraper means forming an entrance wall of said chamber arranged to engage material on the other of said walls for scraping such material from the latter and leading it into said chamber, said material being conveyed over said scraper means and into said chamber under pressure generated by said relative movement, and a restricted extrusion passageway extending away from said chamber for conducting such material therefrom under said pressure.

4. A machine for mixing and extruding a viscous plastic material that adheres to surfaces of the machine, comprising a stationary body having a substantially cylindrical cavity therein, a coaxial rotary drum within said cavity, said drum having its peripheral surface spaced inwardly from the stationary surface of said cavity so as to form a sheet-like channel extending around said drum between said surfaces, the spacing of said surfaces being so limited that the rotation of said drum mixes said material in said channel and drags the same therealong in the direction of such rotation, feed means opening into one end of said channel for supplying plastic material continuously thereunto, one of said surfaces leading at the other end of said channel into a transverse collecting and compression chamber extending away from the other of said surfaces, scraper means fixed relative to said one surface and forming an entrance wall of said chamber arranged to engage material on said other surface and scrape and deflect it therefrom into said chamber, said material being conveyed over said scraper means and into said chamber under pressure generated by said rotation, and a restricted extrusion passageway extending away from said chamber for conducting such material therefrom under said pressure.

5. A machine as described in claim 4, said chamber being formed in said stationary body, the surface of said drum being a true cylinder, and said scraper means comprising a stationary blade lying substantially parallel to the axis of said drum and extending from said stationary body to said drum surface.

References Cited in the file of this patent

UNITED STATES PATENTS

| 1,844,972 | Parkhurst | Feb. 16, 1932 |
| 2,085,978 | Hill et al. | July 6, 1937 |
| 2,434,707 | Marshall | Jan. 20, 1948 |
| 2,264,237 | Brown | Nov. 25, 1941 |

(Other references on following page)

UNITED STATES PATENTS

| | | |
|---|---|---|
| 2,290,916 | Smith | July 28, 1942 |
| 2,444,831 | Kilborn | July 6, 1948 |
| 2,453,088 | Dulmage | Nov. 2, 1948 |
| 2,456,141 | Myerson | Dec. 14, 1948 |
| 2,496,147 | Brillhart | Jan. 31, 1950 |
| 2,566,846 | Martin | Sept. 4, 1951 |
| 2,619,680 | Marshall | Dec. 2, 1952 |

FOREIGN PATENTS

| | | |
|---|---|---|
| 1,056,691 | France | Oct. 21, 1953 |
| 44,646 | Norway | Nov. 12, 1926 |